Patented Feb. 7, 1950

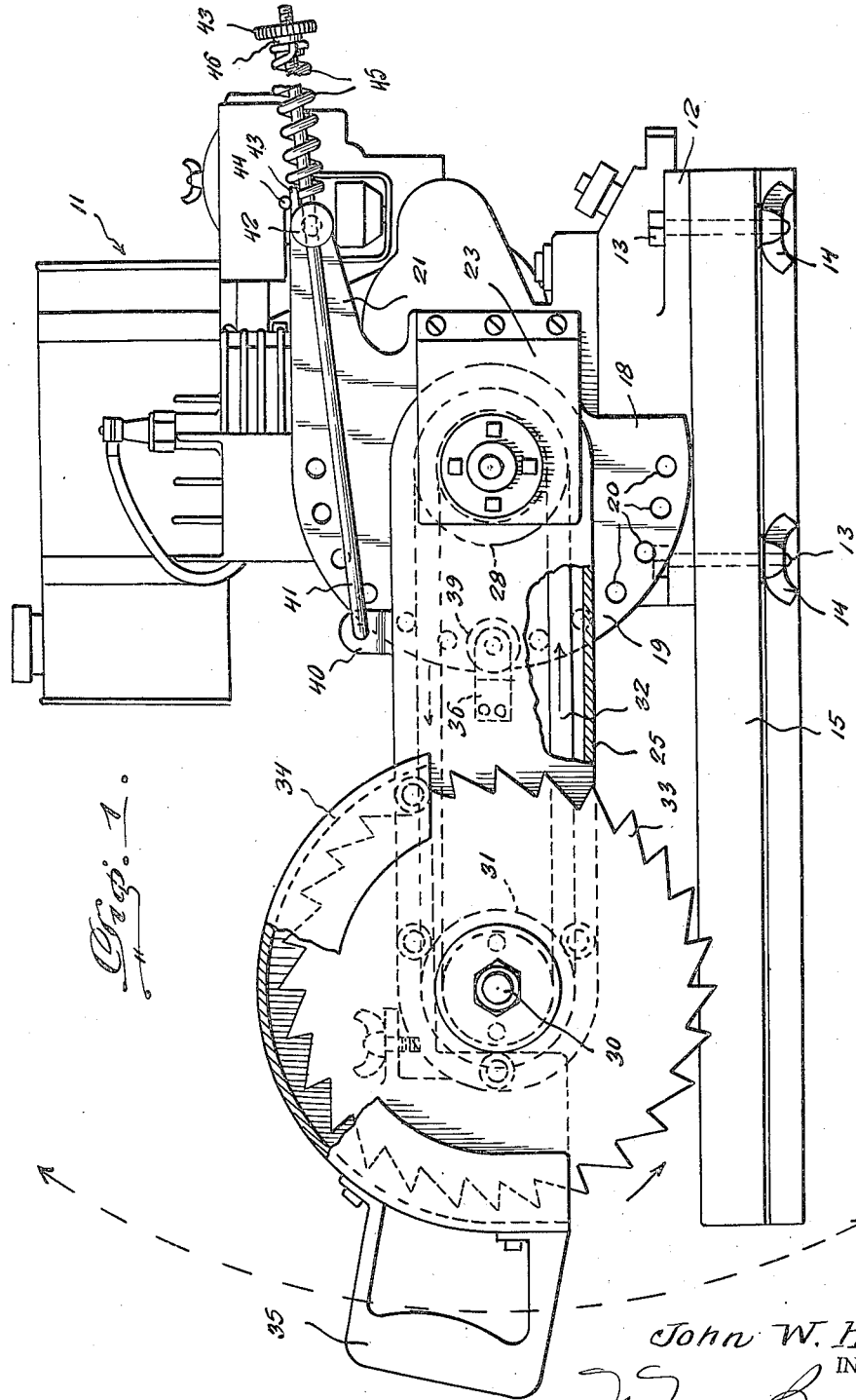

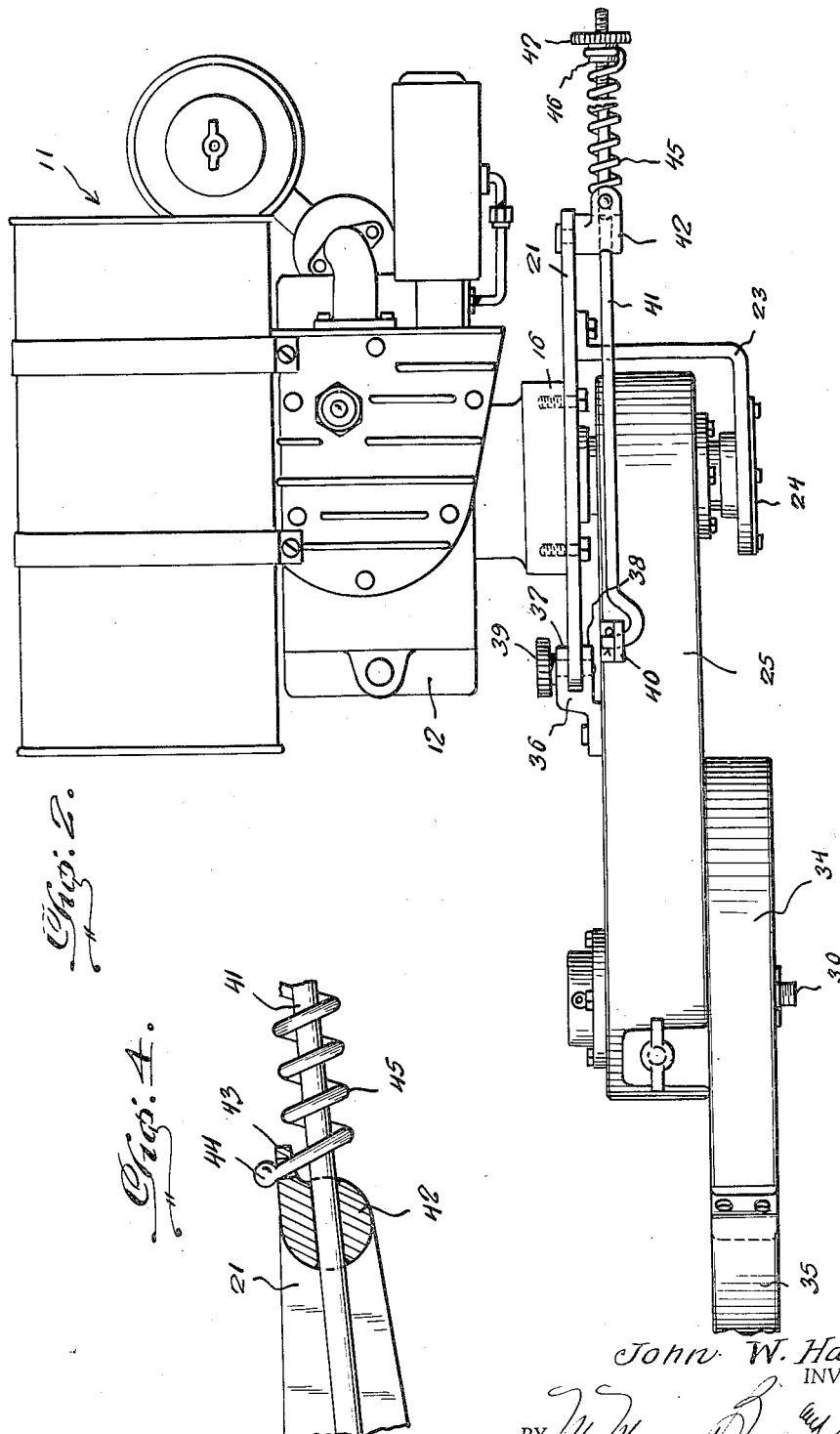

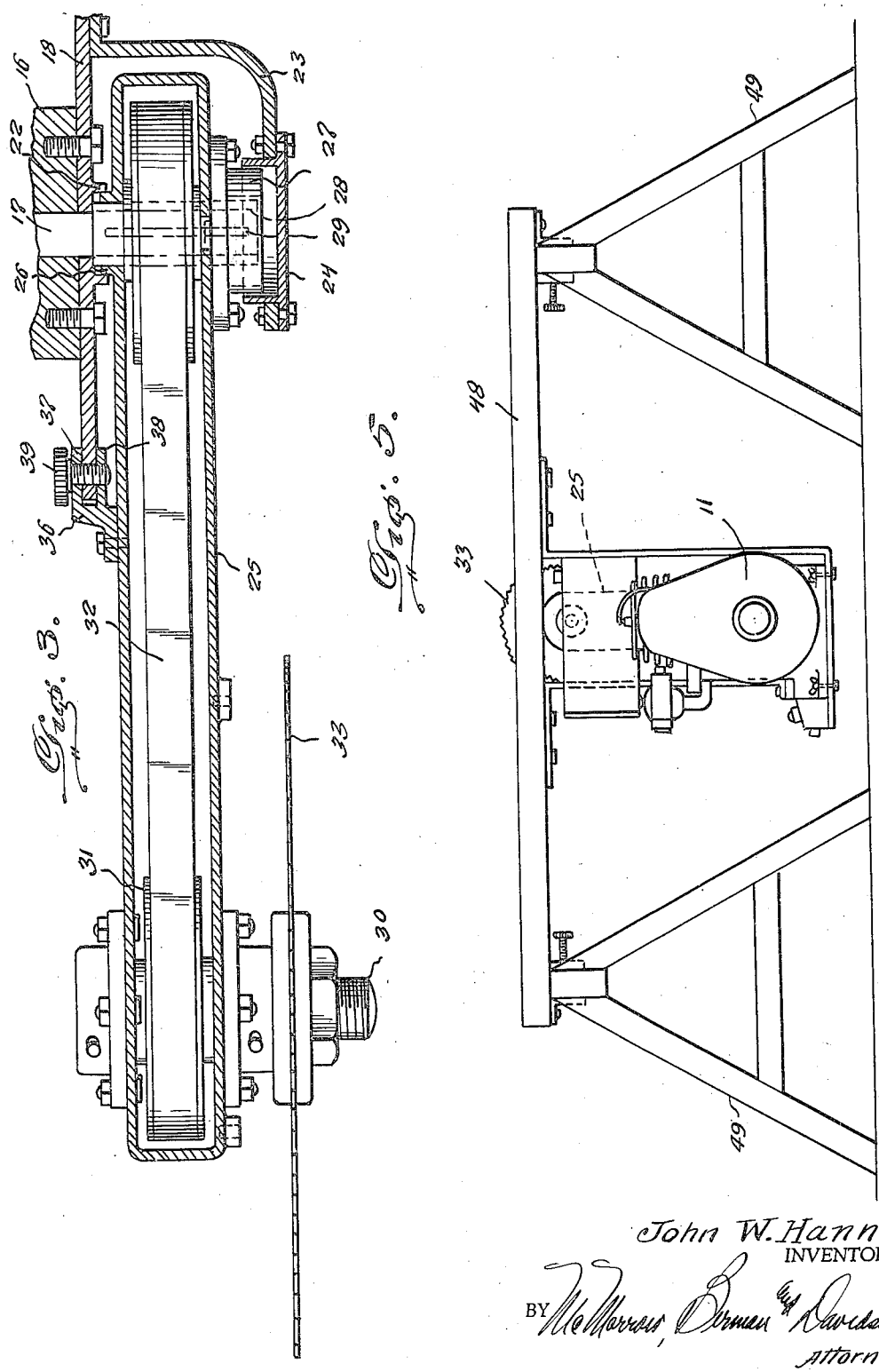

2,496,716

UNITED STATES PATENT OFFICE 2,496,716

SWINGING FRAME PORTABLE SAW

John W. Hanna, Chicago, Ill.

Application May 7, 1946, Serial No. 667,887

3 Claims. (Cl. 143—43)

This invention relates to power saws, and more particularly to power saws of the portable type.

A main object of the invention is to provide a novel and improved portable power saw which is very simple in construction, easy to operate and very efficient in performance.

A further object of the invention is to provide an improved power saw which is sturdy in construction, inexpensive to manufacture and adapted to be readily adjusted for employment either as a swinging blade saw or as a stationary blade saw.

Further objects and advantages of the invention will become apparent from the following description and claims, and from the accompanying drawings, wherein:

Figure 1 is a side elevational view of a power saw constructed in accordance with the present invention.

Figure 2 is a top plan view of the power saw of Figure 1.

Figure 3 is a horizontal cross-sectional view of the power saw of Figure 1.

Figure 4 is an enlarged detail cross-sectional view showing the swivel connection for the end of the saw arm biasing spring, as employed in the saw structure of Figure 1.

Figure 5 is a side elevational view showing the structure of Figure 1 arranged as a stationary head saw.

Referring to the drawings, 11 designates a prime mover which may be a small conventional gasoline engine or the like. The prime mover is provided with a supporting base 12 which may be clamped by means of bolts 13 and wing nuts 14 to any suitable supporting structure such as a table or platform 15.

The shaft housing of prime mover 11 is formed with a widened end portion 16 and rigidly secured to said end portion and extending at right angles to and around the engine shaft, designated as 17, is a plate member 18, see Fig. 3. Plate member 18 is formed with a semi-circular forward portion 19 having a plurality of evenly spaced transverse openings 20 extending adjacent its periphery, and at its upper end is formed with a rearwardly extending lug member 21, see Fig. 1.

Formed on plate member 18 around the shaft opening is an annular rib 22. Secured to the rearward end portion of said plate member is an offset bracket element 23 which carries a cup-shaped bearing member 24 axially aligned with shaft 17.

Journalled for swinging movement in a vertical plane at right angles to shaft 17 is an elongated housing 25, said housing being formed with an annular bearing flange 26 adapted to rotatably fit within annular rib 22 at one side of the housing and having secured to the other side thereof a bearing cap 27 adapted to rotatably fit within cup-shaped member 24. Shaft 17 extends through the hub of a pulley 28 and is rotatively supported transversely in housing 25 at bearing flange 26 and in bearing cap 27, the pulley being connected to shaft 17 by a key 29.

Journalled transversely in the free end of housing 25 is a shaft 30 on which is rigidly mounted a driven pulley 31 connected to the drive pulley 28 by an endless belt 32 which is contained inside the housing. Secured to the end to shaft 30 is a rotary saw blade 33. When the device is to be employed as a swinging blade saw, a guard 34 is secured to housing 25 in protective overlying relation to the upper portion of blade 33, said guard being provided with a handle 35 at the forward end thereof for manipulating the saw blade in an arcuate path around the pivotal connection of housing 25 to plate member 18, whereby objects placed on table 15 under the bottom teeth of the saw blade may be cut through.

Secured to the inner side wall of housing 25 is a lug member 36 formed with parallel guide fingers 37 and 38 adapted to slidably embrace the periphery of semi-circular portion 19 of plate member 18 during swinging movement of the housing 25. The housing may be locked in any desired stationary position with respect to said portion 19 by a thumbscrew 39 which passes through guide finger 37 and a selected opening 20 of portion 19 and is threadedly engaged with the cooperating guide finger 38 of lug member 36.

Integral with the top wall of housing 25 at an intermediate position thereon is an upstanding lug 40 and pivotally connected thereto is a rearwardly extending rod member 41. Rod member 41 passes slidably through a swivel element 42 which is pivotally connected to the rearward end of lug member 21, said swivel element being free to pivot around an axis parallel to the pivotal axis of housing 25. Swivel element 42 is formed with a rearwardly extending eye 43 in which is engaged the upset end 44 of a coil spring 45, which encircles the rearward portion of rod member 41 and is secured to a collar member 46. A nut 47 is threaded on the end of rod member 41 and is adapted to exert pressure on spring 45 through collar member 46 when the rod member 41 is drawn forwardly by housing 25 as the saw blade is moved downwardly in its cutting arc. Spring 45 thus cushions the downward movement of the saw blade during the cutting operation and upon completion thereof facilitates the upward return of the saw blade to its release position. The arrangement of the spring, however, is such that the housing 25 may be raised to a vertical position, as illustrated in Figure 5, without stressing the spring.

When the device is to be employed as a swinging head saw, thumbscrew 39 is removed. When the device is to be employed as a stationary head saw, for example as shown in Figure 5 where housing 25 is positioned vertically, thumbscrew 39 is employed to lock the housing in its selected position with respect to the prime mover. In the arrangement of Figure 5, the prime mover is secured beneath a sawing table 48 by suitable supporting brackets 49 and the housing 25 is locked in vertical position by means of thumbscrew 39. The saw blade guard 34 is removed and the saw blade 33 projects above the plane of the table top a sufficient distance to cut through the desired object as the object is moved along the table against the saw teeth.

While a specific embodiment of a portable power saw device has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A portable power saw comprising a prime mover having a horizontal drive shaft, an elongated housing journalled to said prime mover for swinging movement around the axis of said drive shaft, a transverse driven shaft, journalled in the free end of said housing, power transmission means connecting said drive shaft to said driven shaft, a circular saw blade secured to said driven shaft, a semi-circular vertical plate secured to said prime mover parallel to the plane of movement of and adjacent to said housing, a guide element carried by said housing and slidably engaging the periphery of said semi-circular plate, and means for selectively securing said guide element at predetermined positions around the periphery of said plate.

2. A portable power saw comprising a prime mover having a horizontal drive shaft, an elongated housing journaled to said prime mover for swinging movement around the axis of said drive shaft, a transverse driven shaft journaled in the free end of said housing, an endless belt connecting said drive shaft to said driven shaft, a circular saw blade secured to said driven shaft, a semi-circular vertical plate secured to said prime mover parallel to the plane of movement of and adjacent to said housing, a guide element carried by said housing and slidably engaging the periphery of said semi-circular plate, means for selectively securing said guide element at predetermined positions around the periphery of said plate, a rearwardly-extending lug on said plate, a rod member pivotally secured to the intermediate portion of said housing, a swivel member pivotally secured to said lug for free pivoting movement around an axis parallel to the pivotal axis of the housing, said rod member slidably passing through said swivel member, a stop member on the rearward end portion of said rod member, and a spring encircling said rod member between the stop member and the swivel member, one end of said spring being connected to said swivel member.

3. A portable power saw comprising a prime mover having a horizontal drive shaft, an elongated housing journaled to said prime mover for swinging movement around the axis of said drive shaft in a vertical plane, a transverse driven shaft journaled to the free end of said housing, power-transmission means connecting said drive shaft to said driven shaft, a circular saw blade secured to said driven shaft, a semi-circular vertical plate secured to said prime mover parallel to the plane of movement of and adjacent to said housing, a rearwardly-extending rod member pivotally secured to the intermediate portion of said housing, a guide member pivotally secured to said plate for free pivoting movement around an axis parallel to the pivotal axis of the housing, a guide element carried by said housing and slidably engaging the periphery of said plate, means for selectively securing said guide element at predetermined positions around the periphery of said plate, said rod member slidably passing through said guide member, a stop member on the rearward end portion of said rod member, and a spring encircling said rod member between the stop member and the guide member, one end of said spring being connected to said guide member.

JOHN W. HANNA.

REFERENCES CITED

The following references are of record in the file of this patent:

UNITED STATES PATENTS

| Number | Name | Date |
|---|---|---|
| 1,136,769 | Bruet et al. | Apr. 20, 1915 |
| 1,701,948 | Crowe | Feb. 12, 1929 |
| 1,745,699 | Kleeb et al. | Feb. 4, 1930 |
| 1,778,971 | De Koning | Oct. 21, 1930 |
| 1,783,362 | Goodspeed | Dec. 2, 1930 |
| 2,064,017 | Leschen | Dec. 15, 1936 |
| 2,134,555 | Hajicek | Oct. 25, 1938 |

FOREIGN PATENTS

| Number | Country | Date |
|---|---|---|
| 165,712 | Great Britain | July 7, 1921 |
| 544,470 | France | June 22, 1922 |
| 45,413 | France | May 20, 1935 |

(1st addition to #769,049)